United States Patent [19]
Ahuja et al.

[11] Patent Number: 5,815,596
[45] Date of Patent: Sep. 29, 1998

[54] MULTISCALE IMAGE EDGE AND REGION DETECTION METHOD AND APPARATUS

[75] Inventors: Narendra Ahuja, Savoy; Mark D. Tabb, Champaign, both of Ill.

[73] Assignee: Narendra Ahuja, Lyndhurst, Ill.

[21] Appl. No.: 662,962

[22] Filed: Jun. 13, 1996

Related U.S. Application Data

[63] Continuation of Ser. No. 227,643, Apr. 14, 1994, abandoned.

[51] Int. Cl.$^6$ ....................................................... G06K 9/48
[52] U.S. Cl. ............................................. 382/173; 382/199
[58] Field of Search .................................... 382/173, 199, 382/197, 203, 206

[56] References Cited

U.S. PATENT DOCUMENTS

| | | | |
|---|---|---|---|
| 4,658,372 | 4/1987 | Witkin | 382/22 |
| 4,747,151 | 5/1988 | Knutsson et al. | 382/22 |
| 4,958,374 | 9/1990 | Tokita et al. | 382/22 |
| 5,027,419 | 6/1991 | Davis | 382/28 |

OTHER PUBLICATIONS

Detection and Representation of Multiscale Low–level Image Structure Using a New Transform, Mark Tabb and Narendra Ahuja, ACCV '93 Asian Conference on Computer Vision, Nov., 1993.

Van Oeffelen et al. "An algorithm for Pattern Description on the Level of Relative Proximity", Pattern Recognition v16, No. 3 pp. 341–348, 1983.

*Primary Examiner*—Joseph Mancuso
*Assistant Examiner*—Larry J. Prikockis
*Attorney, Agent, or Firm*—Baker & Botts, L.L.P.

[57] ABSTRACT

A method for determining region boundaries in an image comprises the steps of providing an image having a plurality of discrete points, determining for each discrete point in the image an affinity force vector representing the affinity of the point to every other point in the image, and detecting region boundaries in the image using the affinity force vectors. An apparatus for determining region boundaries in an image comprises means for providing an image having a plurality of discrete points, means for determining for each discrete point in the image an affinity force vector representing the affinity of the point to every other point in the image, and means for detecting region boundaries in the image using the affinity force vectors. Automatic spatial parameter selection for input in the affinity force vector determination and regional axis detection methods are also provided.

16 Claims, 12 Drawing Sheets

STEP I. Compute Field
for each $\sigma_g = \sigma_g^i$, where $i = 1..\text{Num\_scales}, \sigma_g^j < \sigma_g^k$ for $j<k$
    for all $(x_0, y_0) \in I(x,y)$
    compute $(\vec{F}\sigma_g(x_0, y_0) = \sum d_g(\Delta I, \sigma_g) \cdot d_s(\vec{r}, \sigma_g(x_0, y_0)) \frac{\vec{r}}{||\vec{r}||}$
        $(u,v) \in I(x,y)$
        $= (\vec{F}\sigma_g(x_0,y_0)_x, \vec{F}\sigma_g(x_0,y_0)_y)$
    selecting $(\sigma_s x_0, y_0) \in [\sigma_s^-, \sigma_s^+]$, where $\sigma_s^- = \min(\sigma_s)$ such that $||\vec{F}\sigma_g(x_0, y_0)|| \geq T$
    and $\sigma_s^+ = \min(\sigma_s)$ such that $\frac{d^2 \theta(\sigma_s)}{d\sigma_s^2} \geq 0$ for $\sigma_s \geq \sigma_s^-$ rof
rof $I(x,y)$: image array  $d_g(\cdot)$: homogeneity distance function  $d_s(\cdot)$: spatial distance function
$\Delta I = |I(x_0, y_0) - I(u,v)|$  $\vec{r} = (u-x_0)\vec{i} + (v-y_0)\vec{j}$  $T$: threshold
$\theta(\sigma_s)$: angle of $\vec{F}\sigma_s(x_0, y_0)$ from some reference direction STEP II. Extract Region Boundaries
for each $\sigma_g = \sigma_g^i, i = 1..\text{Num\_scales}$
    for all $(x_0, y_0) \in \vec{F}\sigma_g(x,y)$
    Compare $(x_0, y_0)$ with each of its eight nearest neighbors to determine whether
    or not boundary points are present. The following test is used for $(x_0, y_0)$ and its
    rightmost nearest neighbor $(x_0+1, y_0)$:
    IF $\vec{F}\sigma_g(x_0, y_0) \leq 0$ AND $\vec{F}\sigma_g(x_0+1, y_0)_x \geq 0$ AND
        $\frac{\vec{F}\sigma_g(x_0, y_0) \cdot \vec{F}\sigma_g(x_0+1, y_0)}{||\vec{F}\sigma_g(x_0, y_0)|| \; ||\vec{F}\sigma_g(x_0+1, y_0)||} \leq \cos(20°)$
    THEN label $(x_0, y_0)$ AND $(x_0+1, y_0)$ as boundary points for all $\sigma_g = \sigma_g^j$,
    $j = 1..i$
    Analogous test are used for the other seven nearest neighbors of $(x_0, y_0)$ rof
rof

FIG. 5(a)

STEP III. Identify Finest Scale Regions ($\sigma_g = \sigma_g^1$)
1. Obtain the regions by performing connected component labelling using 4-point pixel connectivity on all pixels not labelled as boundary points at $\sigma_g = \sigma_g^1$
2. Assign the boundary points at $\sigma_g = \sigma_g^1$ to the identified regions as follows:
n=0
while NOT (all boundary points assigned)
    for all $(x_0, y_0) \in \hat{I}(x,y)_n$
        $\hat{I}(x_0,y_0)_{n+1} = \hat{I}(x,y)_n$
    rof
    for all $(x_0, y_0) \in \hat{I}(x,y)_n$ where $(x_0, y_0)$ a boundary point
        IF $\hat{I}(x_0,y_0)_n$ has a neighboring region (4-point neighbor)
        THEN $\hat{I}(x_0,y_0)_{n+1}$ = neighboring region most similar in average intensity
    rof
    n → n + 1
elihw $\hat{I}_0$: array of the initial regions plus the boundary points at $\sigma_g = \sigma_g^1$
$\hat{I}_n$: after the preceding process has terminated, this array contains the final finest scale regions STEP IV. Identify Coarser Scale Regions ($\sigma_g = \sigma_g^i$, i = 2..Num_scales)
for each ($\sigma_g = \sigma_g^i$, i = 2..Num_scales)
    for each pair of neighboring regions present at $\sigma_g = \sigma_g^{i-1}$
        compute the associated edge segment (set of all points on the boundary of the two regions)
    rof
    for each pair of neighboring regions present $\sigma_g = \sigma_g^{i-1}$,
        merge the regions together if a majority of the points on the associated edge segment are not labelled as boundary points at $\sigma_g = \sigma_g^i$
    rof
rof

FIG. 5(b)

MULTISCALE IMAGE EDGE AND REGION DETECTION METHOD AND APPARATUS

This application is a continuation of application Ser. No. 08/227,643, filed Apr. 14, 1994, now abandoned.

At least a part of the work relating to this invention was performed with United States Government support through the National Science Foundation and Defense Advanced Research Projects Agency under grant IRI-89-02728 and the Defense Advanced Research Projects Agency under grant N00014-93-1-1167. The United States Government may have certain rights in the invention.

FIELD OF THE INVENTION

The invention relates generally to a method for determining spatial structure in data. More specifically, the invention relates to detection of edges or regions in multiscale images.

BACKGROUND OF THE INVENTION

Determination of spatial structure of data is important in many applications. The structure in any image is defined by the spatial contiguity of brightness (also called intensity/color) which results in the formation of regions. The challenge of structure detection (also called segmentation) lies in accurately locating the region boundaries (also called edges in the two-dimensional case), regardless of the region size, the contrast across the boundary, and the boundary curvature.

Structure detection refers to computational recognition of how data varies in its space, for example, where it is uniform, where it varies, and to what degree it varies. Thus, structure detection may be used, for example, to delineate a geographic region in which there are 100 mile per hour winds out of the southwest on a map; outline the region of a body in which there is exceptionally dense or dark matter; or identify, in a satellite image, ground regions that contain water or desert or urban areas. Numerous other applications utilize structure detection, some of which are identified below.

There are two major categories with regard to which techniques for structure detection are evaluated. The first category is concerned with accurate detection of regional boundaries. Techniques available in the related art commonly test groups (neighborhoods) of image points around a given point to determine if the group lies in the interior of a region, or if there is an edge passing through a given point. To do so, these methods make assumptions about the nature of any boundary that may pass through the neighborhood. For example, it is common to assume that the direction perpendicular to the edge at any point can be identified. Therefore, these methods treat the problem of edge detection at a point as mainly that of selecting a point along the direction across the edge using the brightness values in that direction. For identification of the direction perpendicular to the edge, it is common to assume that the edge curvature is limited. For example, it is common to assume that the edge is straight near the point of interest, and that the brightness changes in a ramplike (linear) manner in a direction parallel to the edge.

For illustration, a region R is depicted in FIG. 1. In order to determine an edge of region R through a point P, some related art methods assume an axis x through the point P which crosses the edge. Therefore, the edge in the direction of axis x may be determined by comparing the brightness values, or its rate of change, along axis x. The point on axis x where the brightness value changes by an amount larger than (or at a rate beyond a predetermined value) is where an edge occurs. Table 1 below illustrates brightness values for region R at the various points a–k. According to the methods of the related art, point f would be determined as lying on the edge if for example, the predetermined value became three (3). f is selected as being on the edge because the change of 4 from f to g is greater than three.

TABLE 1

Sample brightness values along axis x through region R in FIG. 1

| Point | Brightness value (scale of one to ten) |
|---|---|
| a | 8 |
| b | 8 |
| c | 8 |
| d | 7 |
| e | 8 |
| f | 7 |
| g | 3 |
| h | 1 |
| i | 1 |
| j | 1 |
| k | 1 |

Although FIG. 1 presents an example where the related art methods may produce the proper result, edges in real images do not always conform with the assumptions which are made in those methods. Deviations from the assumptions lead to detection errors.

The second major category for evaluating structure detection relates to scale. Scale is associated with sensitivity to both spatial (also called geometric) and brightness (also called photometric) detail. It is well known that an image point may simultaneously belong to different regions each having a different contrast value and size. Large regions may be said to have a coarse spatial scale while smaller sizes may be said to be associated with finer spatial scales. Analogously, an edge contour which separates two regions of a given contrast scale may not be detected at a higher scale associated with a larger contrast. For example, in atmospheric data, there may be a rather large region with roughly 100 mile per hour winds out of the southwest. This large region may contain smaller regions, for example, three different pockets of 90 mph, 100 mph and 110 mph winds. The distinction and delineation of these pockets may be important for a detailed (fine contrast scale) analysis but may be ignored for a rougher (coarser photometric scale) characterization of the weather. Similarly, it may be necessary to follow exactly (at fine geometric scale) the boundary of a tornado-susceptible region to warn the residents likely to be affected, whereas such an area may be shown only in rough detail (at coarse geometric scale) to weather watchers far away from the region of the tornado activity. Techniques used in the past are limited because they require that the sizes and contrasts for the region being detected must be specified. However, since the region sizes and contrasts in an image are arbitrary and unknown in advance, these techniques cannot automatically and accurately detect regions at all scales present in an image. Thus, there presently exists no method for correctly detecting multiscale structure in an arbitrary image.

SUMMARY OF THE INVENTION

In view of the foregoing, it is an object of the present invention to overcome these and other drawbacks of the prior art.

It is an object of the present invention to provide a suitable multiscale structure detection method and apparatus which automatically estimates the scale parameters and detects the corresponding regions and their axes.

Specifically, it is an object of the present invention to provide a method and apparatus for achieving curvature invariance. That is, an edge point is detected at the one correct location, regardless of whether the edge in the vicinity of the point is straight, curved or contains a corner.

It is another object to provide a method and apparatus for achieving brightness scaling to detect regions of varying contrast.

It is another object to provide a method and apparatus for achieving spatial scaling to detect regions of varying sizes.

It is another object to provide a method and apparatus for achieving automatic scale selection so that the contrasts and sizes of regions contained in an arbitrary image may be accurately identified automatically.

Accordingly the present invention provides a method and apparatus for determining region boundaries in an image. The method comprises the steps of providing an image having a plurality of discrete points, determining for each discrete point in the image an affinity force vector representing the affinity of the point to every other point in the image, and detecting region boundaries in the image using the affinity force vectors. An apparatus for determining region boundaries in an image comprises means for providing an image having a plurality of discrete points, means for determining for each discrete point in the image an affinity force vector representing the affinity of the point to every other point in the image, and means for detecting region boundaries in the image using the affinity force vectors.

The present invention includes the use of a new transform which enables more accurate edge detection in a variety of spatial images. The transform calculates affinities of points to group with other points to form regions. Being the smallest unit of space, points may be grouped together to follow any region boundary, just as an island shape is congruent with the space occupied by a set of contiguous, similar particles, whatever the complexity of the boundary. The particles group together and coalesce into regions based on the similarity of their intrinsic properties only, regardless of their relative locations. The common properties of the particles then characterizes the region they form.

According to the present invention, the structure may be extracted by grouping each set of points having the same property to form a region. This is achieved by making computations on pairs of pixels followed by vector integration of the results, rather than scalar, weighted averaging over pixel neighborhoods, as is done in linear methods.

BRIEF DESCRIPTION OF THE DRAWINGS

FIG. 5 is a detailed process illustrating one implementation of the multiscale segmentation method according to this invention.

DETAILED DESCRIPTION OF THE INVENTION

Figure 1:
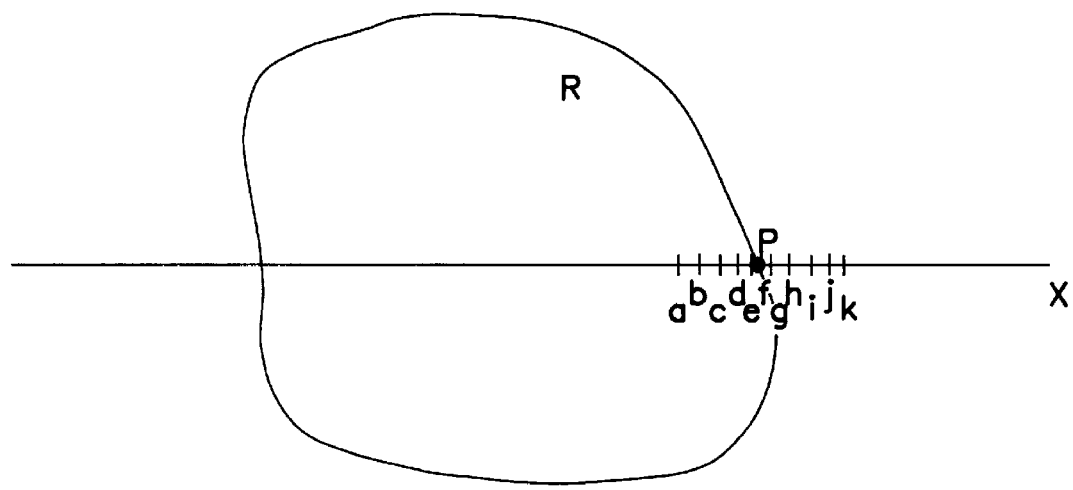
FIG. 1 depicts a schematic representation of an image region R.

The present invention extracts structure in data by grouping data points to form islands of homogeneous properties. For simplicity the term "image" will be used generally to refer to all types of data. For example, images may refer to scalar or vector data, in any dimensional space. For simplicity, the invention will be explained by referring to a common picture (scalar, two-dimensional data). However, the invention is not so limited. Further, for explanation, uniform regions are often assumed. The invention is not limited to region detection of uniform regions, but, as described below, also provides for detection of regional boundaries in heterogenous regions.

The data may be defined in any dimensional space. To illustrate, waveform data such as EKG, EMG, stock market variation, and pressure/temperature variation, are one-dimensional data, defined in the time space. A photograph, a common paper picture, or an x-ray, and temperature or pressure distribution at some height above ground are two-dimensional data, defined in the horizontal-vertical (xy) space. Density data of a body part obtained by tomography or magnetic resonance imaging (defined in xyz space, z representing depth), a black and white video movie (defined in xyt space, t representing time), pressure or temperature distribution in the atmosphere (defined in xyz space) are three-dimensional data. A sequence of tomographic or magnetic resonance imaging data sets collected over time showing the same fixed body part, and atmospheric temperature or pressure history are four-dimensional data, all defined in xyzt space. Higher dimensional data characterize other scenarios. Hence, each point in an image data may represent m dimensional data, wherein m may be a discrete number from 1 to infinity.

The data may be vector data, i.e., each entry in the data may not be just one number but a set of values, unlike the above examples wherein pressure/temperature/brightness are each a scalar (single) number. For example, each entry in wind direction data consists of two numbers required to specify direction. A color picture/movie must record the three, for example, red, green and blue, color components instead of just the gray value. Recording a given number n of features at each point in a finger print image results in an n-long vector comprising each data entry. The value n may be any discrete number from 1 to infinity. Thus, the present invention may operate on image points representing n dimensional data at a location in an m dimensional space, wherein n and m may be discrete numbers from 1 to infinity.

According to one aspect of the present invention, a method of determining regional boundaries of a region at a single geometric and photometric scale is provided. A first step is to select two parameters for the affinity force vector determination. A spatial scale parameter, $\sigma_s$ (also referred to as the geometric scale parameter) determines the range of points for which the region analysis is conducted. In single scale image analysis, to detect structural characteristics of a region, the determination is confined to the "vicinity" of the region. Otherwise, the computation reflects multiregion structure. Therefore, in a single scale analysis the spatial scale parameter is used to determine a "cut-off distance" such that the points beyond this distance are given little or no consideration in the analysis. The spatial scale parameter varies spatially. The spatial scale parameters at different points in a region are mutually dependent because they are all determined by the same region boundary. In other words, because the region necessarily factors into the determination of the spatial scale parameter, as the location of the image being analyzed changes, so does the spatial scale parameter. Because the region structure is not yet known, the spatial scale parameters must either be known, estimated, or automatically determined according to a method of the present invention. In single scale analysis, the parameters have generally already been determined, or are known.

The second parameter, a contrast scale parameter $\sigma_g$, also known as a gray scale or photometric parameter, is determined by the degree of homogeneity within the region of interest containing the point being evaluated. For example, if gray scale is being used, the gray scale parameter ($\sigma_g$) represents the level of homogeneity of gray scale values between points beyond which a point experiences negligible attraction to another point and thus the gray level differences that can exist between points within the same region. For example, in FIG. 1 taken with the brightness values of Table 1, if $\sigma_g=2$, then points a–f would be determined to be in region R. However, if $\sigma_g=5$, then point g may also be determined to be in region R because the variance (difference) between point g and the other points on the gray level scale is 5 or less, which may be within the gray scale parameter limit. Like the spatial scale parameter, the contrast scale parameter may be determined by either automatic determination, estimation, or prior knowledge.

Once the two parameters have been either determined or selected, an attraction-force field for each point in the image is determined. This attraction-force field determination considers the spatial scale and contrast scale parameters discussed above. The determination yields a force vector for each point. The force vector points in the direction in which the point experiences a net attraction from the points in the rest of the image. A point inside a region experiences a force towards the interior of the region. This force is the resultant vector of attraction forces from all other image points in the image.

Once force vectors for each point have been determined, a plot may be generated which depicts the magnitude and direction of the force vectors for each point in the image. From this plot, regional boundaries may be determined by examining the plot. The force vectors may be computed such that the closer a point is to a regional boundary, the higher the magnitude of the force toward the center of the region becomes. Further, the direction of the vector points toward the center of the region. Thus, by simply examining the plot, regional boundaries for the image may be determined. A force vector for a point outside the region R points towards the center of region in which that point lies, not toward region R. Thus, the force vectors for two adjacent points, one inside a region, and the other outside the region is represented on the plot by arrows pointing in opposite directions. Therefore, regional boundaries are easily detected.

As discussed above, once the spatial scale parameter and the contrast scale parameter have been either determined or selected, the attraction force for a point with respect to other points is determined. For a pixel P located at location p, the attraction to another pixel Q at location q is given by a force vector $\vec{F}(p,q)$; where F(p,q) denotes the magnitude of this force (p and q are position vectors). The transform according to the present invention is given by the equation below:

$$\vec{F}(p,q) = F(p,q)\hat{r}_{pq}$$

where $\hat{r}_{pq}$ denotes the unit vector in the direction from P to Q, i.e., $$\hat{r}_{pq} = \frac{q-p}{\|q-p\|}$$

In the continuous image plane, an image is transformed into a continuous vector field. The force vector at point P is given by:

$$\vec{F}_p = \int_{q \neq p} F(p,q)\hat{r}_{pq} dq$$

where q is any and every image location other than p. In the discrete case, as is the case for image analysis where a finite number of pixels may be analyzed, the equation becomes:

$$\vec{F}_p = \sum_{q \neq p} F(p,q)\hat{r}_{pq}$$

The forms that the force function F(p,q) may take may be specified by identifying the characteristics that any such function must possess to yield the correct structure at a given scale, and to exhibit appropriate behavior across multiple spatial and brightness scales. Specific choices of force functions having these characteristics define different instances of the transform. Because the presence of an edge of a region at any given scale is determined by its immediate vicinity (adjoining regions) rather than by distant points across other intervening regions, the force F exerted on a given pixel P by another pixel Q is a decreasing (or nonincreasing) function of the distance between P and Q. Further, a pixel is attracted more to a pixel within its own region than to one in a different region. This is accomplished by making F to be a decreasing (or nonincreasing) function of the difference between the gray levels of P and Q.

As discussed above, the limits for the integral in the force vector determination are set by the spatial scale and contrast scale parameters. The spatial scale parameter determines the points which are to be given consideration in the determination and the contrast scale sets the affinities or attractions that yield the magnitude of the force. Several properties exist in the context of a single geometric and photometric scale. These properties aid in characterizing the regions. Examples are listed below.

Null Interior Response: The magnitude of $\vec{F}$ is zero in a completely homogeneous image.

Response Near Border: $\vec{F}_p$ may be computed such that its magnitude at a point P inside a region R increases as P moves closer to the region boundary. The direction of $\vec{F}_p$ points toward the interior of the region.

Figures 2A, 2B:
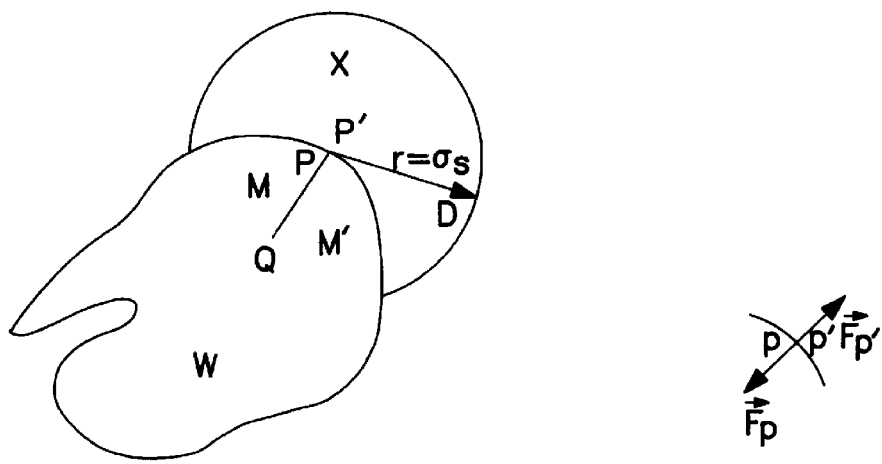
FIG. 2(a) depicts a schematic representation of two adjoining image regions X and W.
FIG. 2(b) depicts a force vector determination plot of two points near the boundary between regions X and W.

Orthogonality: With reference to FIG. 2(a), consider a pair of points P and P' inside adjacent homogeneous regions W and X, respectively, and infinitesimally close to the common boundary. If the region boundary between W and X is symmetric about P within the disk D of radius r=$\sigma_s$ centered at P, then the direction of $\vec{F}$ points into the region W and is normal to the boundary at P. Analogously, the direction of $\vec{F}_{p'}$ points away from the region W and into the region X and is normal to the boundary at P', as depicted in FIG. 2(b).

Figure 3A:
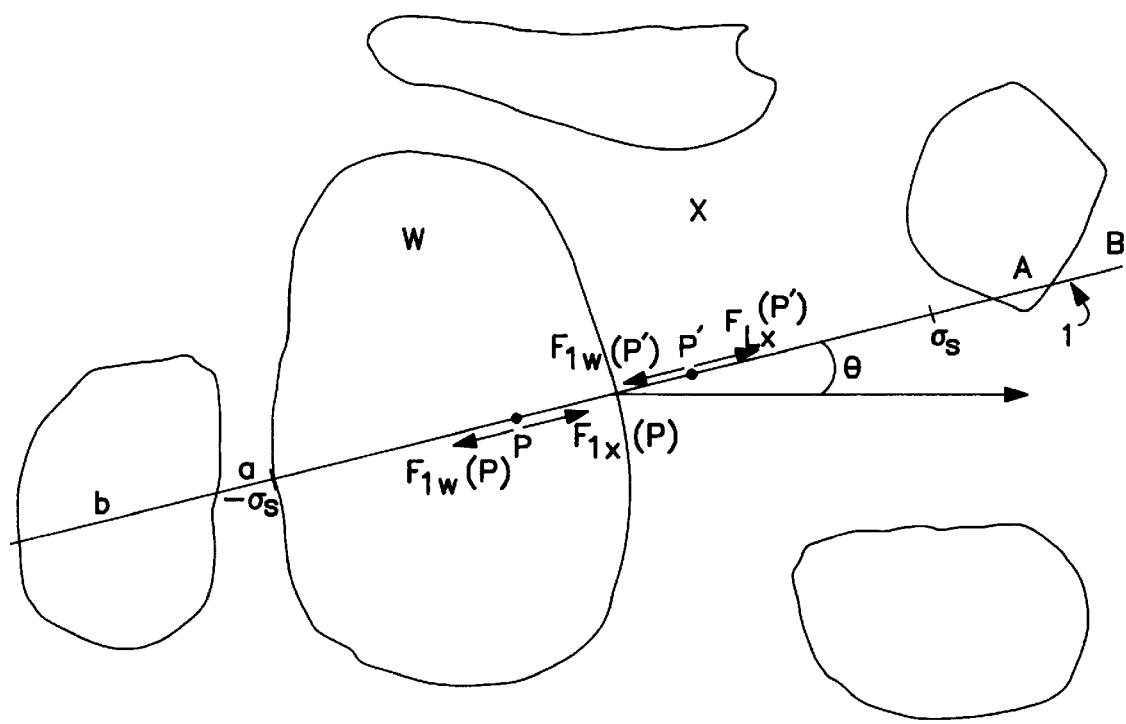
FIG. 3(a) depicts a schematic representation of an image containing a plurality of image regions.
Figure 3B:
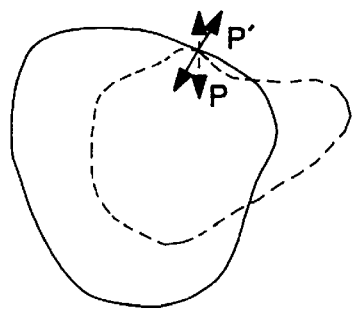
FIG. 3(b) depicts a schematic of force vector determinations for varying region boundaries.

Direction Reversal: Referring to FIGS. 3(a) and 3(b), a pair of points P and P' inside and outside, respectively, a homogeneous region W, and infinitesimally close to W's boundary is depicted in FIG. 3(a). If F is computed using the spatial scale parameter $\sigma_s$ for the region of interest, the directions of $\vec{F}_p$ and $\vec{F}_{p'}$, are π radians (180°) apart. Thus, in FIG. 3(a), if the spatial scale parameter $\sigma_s$ corresponds to region W, then the force vectors at P and P' are equal and opposite (i.e., π radians apart). As the boundary about P (and P') is reshaped, as depicted in FIG. 3(b) going from a dotted line to a solid line, then the force directions at P and P' become more aligned with the normal to the boundary. The orthogonality property described above with respect to FIGS. 2(a) and 2(b) is a special case of the direction reversal property because the force directions at P and P', in addition to being opposite, also coincide with normals to the boundary due to the symmetry of the boundary curve.

These properties define the force vector for each point in the image. As stated above, only two criteria for the force function are necessary to meet the above properties. As long as the force function is a nonincreasing function of distance between P and Q as well as a nonincreasing function of the difference between the gray levels of P and Q, the properties described above hold true. Thus, any function which satisfies these two criteria may be used. For example, Gaussian, exponential, linear and pulse functions may be used in the determination of the force values. The desired speed of the determination may be one factor used to determine which of the above functions may be used. For example, a linear function may integrate faster and therefore, be more advantageous if a large number of image points are being analyzed.

One preferred function is generated by defining the force function as a product of two Gaussians. The first Gaussian is defined as a decreasing function of the distance d(p,q) between P and Q, and the other Gaussian is defined as a decreasing function of the gray level difference, Δg(p,q) between P and Q. The standard deviation for the first decreasing function is the spatial scale parameter, $\sigma_s$, and the standard deviation for the gray level variation is the contrast scale parameter, $\sigma_g$. Each of these may be multiplied by a constant, if desired, to produce the desired scale behavior. The choice of Gaussian for each part results in optimal localization properties in both spatial and spacial frequency domains, in addition to others such as separability in computation. The function at an image location P using the two Gaussians is given by the equation below:

$$\vec{F}_p = \int_{q \neq p} e^{\frac{-d^2(p,q)}{2\sigma_s^2}} e^{\frac{-\Delta g^2(p,q)}{2\sigma_g^2}} \vec{r}_{pq} dq$$

After this equation has been applied to each image point in the image, regional boundaries may be determined, since the force function at a region boundary becomes discontinuous. Therefore, regional discontinuities are easily detected because the force vector at each point along the boundary is indeterminate. Thus, region boundary detection may be performed either manually by observing a plot of the force vectors or automatically by observing the points of discontinuity in the image for the particular scale.

The invention may also be employed in a multiscale environment to determine the boundaries of regions at all geometric and photometric scales with the scale parameters being determined automatically or manually. In an image in which the spatial scales are unknown, the affinity force vector at each point is computed over a neighborhood of appropriate radii (spatial scale). If the neighborhood used is too small, then the force magnitude will be small because of symmetry and therefore detection may not be robust. If the neighborhood radius is increased beyond the actual spatial scale value at the point for the region under consideration, the computed force begins to be influenced by other regions, having independent gray levels and shapes, and therefore ceases to reflect the structure of the region of interest. For such scale adaptive computation of the force vector, the following additional properties are important. These properties exist in addition to the four properties described for single scale contexts.

Smoothness: If the force function F(p,q) is a differentiable function (varies smoothly) of the Euclidean distance d(p,q), gray level contrast Δg(p,q), and the spatial scale parameter $\sigma_s$; and the force function F(p,q) is computed at each point in the region using the appropriate $\sigma_s$ value, then the resulting affinity force vector $\vec{F}$ is also differentiable (varies smoothly) at all nonboundary and nonskeleton points of the region.

Closure: If the spatial scale parameters at all points in a region are chosen appropriately, the direction discontinuities of $\vec{F}$ form closed contours around the region and coincide with region boundaries.

The method described above assumes a single scale and provides for regional image detection for single scale images. However, many images are not single scale, as discussed in the background of the invention. Rather, image structure is, in general, hierarchical. Regions are recursively embedded, each standing in contrast with its surround and characterized by its own gray level variation (or the degree of gray level homogeneity). The present invention when operating to perform automatic scaling, assumes that an increasing value of $\sigma_g$ corresponds to increasingly nonuniform regions. Thus, $\sigma_g$ comprises one index into the structural hierarchy. An image point is associated with multiple regions and thus with multiple gray level scales. Further, since each region has its own shape and size, and the spatial scale of a point is defined with respect to a region, each image point is also associated with a number of spatial scales ($\sigma_s$ values) corresponding to the different regions that it belongs to. Therefore, each image point is associated with a number of $\sigma_s,\sigma_g$ pairs, each pair corresponding to a region to which the point belongs. Since a point belongs to only a finite (actually small) number of hierarchically related regions, the point has a small number of scale pairs associated with it, usually sparsely located in the $\sigma_s,\sigma_g$-space.

Automatic scale parameter determination may be used to determine the appropriate scales associated with each point in the image. The $\sigma_s,\sigma_g$ values associated with any point are generally unknown in advance and may be determined in the method of the present invention before single scale image analysis occurs. To do this, force vector determination is used to determine the force at a specific image point P using the entire range of $\sigma_s,\sigma_g$ values. Suppose for a given pair of values that correspond to a specific image region R containing the point P, the ideal (the one using the proper spatial and contrast scale parameters) force vector is denoted by V. Away from these $\sigma_s, \sigma_g$ values, $\vec{F}_p$ will gradually deviate from V. Somewhere between a pair of values $\sigma_{s1}, \sigma_{g1}$ and $\sigma_{s2}, \sigma_{g2}$ corresponding to two regions R1 and R2 at different adjacent scales in the hierarchy, the deviation of $\vec{F}_p$ is maximal from both $V_1$ and $V_2$. Thus, in the $\sigma_s, \sigma_g$-space, the locations corresponding to the actual scales present at an image point are sparse and are characterized by local stability of $\vec{F}$ around the true value V. The scale values in the rest of the $\sigma_s, \sigma_g$-space will correspond to a more severe variation in the value of the force vector. Therefore, by identifying those locations in the $\sigma_s, \sigma_g$ -space where the force vector is locally stable (has locally minimal variation), the true scales associated with P may be determined. Each such pair corresponds to one of the regions that the point belongs to. An image point has as many scales associated with it as the number of different regions to which it belongs. Regardless of exactly how the $\sigma_s, \sigma_g$-space is scanned, the result is the appropriate set of $\sigma_s, \sigma_g$ values for each image point. The scales selected at all points in a region are mutually related since the same region factors in the selection of scales at all points in the region. Thus, if each point of the image is analyzed to estimate all pairs of scale parameter values associated with it, and the transform is applied at each point using these scale values, then each point on a region border is characterized by a spatial discontinuity of magnitude X in the direction of $\vec{F}$ when $\vec{F}$ is computed using the $\sigma_s, \sigma_g$ values at each point corresponding to the given region. In this manner, region boundaries and other image details may be determined even for multiple scale images.

In one implementation of this multiscale structure detection method, $\sigma_g$ is used as an independent scale parameter and $\sigma_s$ is computed. Identifying edges solely in terms of homogeneity implicitly requires the use of an appropriate amount of spatial information. As a result, a spatial scale, denoted by $\sigma_s$ is associated with each point in a signal (or image). The spatial scale selected at a given point indicates the proximity of the point to the boundary of the region to which it belongs.

For a given $\sigma_g$, a corresponding $\sigma_s$ is chosen at each pixel such that a connected region at a certain scale containing that pixel yields an area of contracting flow (inward force vectors). The region boundary is then the source of the flow, i.e., force vectors point inward from the region boundary. For a given $\sigma_g$, at each pixel $(x_o, y_o)$ belonging to an image, $\sigma_s (x_o, y_o)$ is chosen to yield connected areas of contracting flow in F. In general, a continuous range of values of $\sigma_s (x_o, y_o)$, denoted $[\sigma_s^-, \sigma_s^+]$, suffices. $\sigma_s^-$ may be defined as:

$$\sigma_s^- = \min(\sigma_s) \text{ such that } \|\vec{F}_{\sigma_s}(x_o, y_o)\| \geq T$$

where T is a positive constant. The value of $\sigma_s^+$ is the largest $\sigma_s (x_o, y_o)$ which does not result in overscaling. Overscaling implies that a pixel is attracted to a disconnected region of attraction. This situation is detected by examining the behavior of $(x_o, y_o)$ as $\sigma_s (x_o, y_o)$ is increased beyond $\sigma_s^-$. As this occurs, the pixel initially still belongs to the connected region of attraction. The vector direction tends to change very slowly as long as this is true. However, when $\sigma_s (x_o, y_o)$ becomes large enough, a transition occurs and the pixel now belongs to a different region of attraction. The vector direction changes much more rapidly during such a transition. As $\sigma_s (x_o, y_o)$ is further increased, the same type of behavior occurs: the vector direction initially changes very little but then changes more rapidly as a transition occurs. This state of little change may be termed spatial stability. For each region of attraction to which the pixel $(x_o, y_o)$ belongs, the value of $\sigma_s (x_o, y_o)$ for which the vector direction changes the least is called a spatially stable point. $\theta(\sigma_s)$ is defined as the angle of $\vec{F} (x_o, y_o)$ from some reference direction as $\sigma_s (x_o, y_o)$ is varied. To prevent overscaling, the upper bound, $\sigma_s^+$, is defined as the value of the first spatially stable point, i.e., $$\sigma_s^+ = \min(\sigma_s) \text{ such that } \frac{d^2}{d\sigma_s^2} \theta(\sigma_s) \geq 0$$

for $\sigma_s \geq \sigma_s^-$. Selecting each $\sigma_s (x_o, y_o) \in [\sigma_s^-, \sigma_s^-]$ yields a properly scaled F.

At this stage, for a given value of $\sigma_g$, each $\sigma_s (x_o, y_o)$ is chosen properly. Now, as $\sigma_g$ is varied, a pixel belongs to the same region of attraction for some range of values, and then makes a transition and becomes a part of another region of attraction. These regions of attraction are connected since $\sigma_s$ is always scaled appropriately. Transitions between regions of attraction typically occur abruptly.

For some range of $\sigma_g$, the $\vec{F}$ vectors in a homogeneous region form a connected region of attraction. As $\sigma_g$ is increased beyond this range, the vectors transition to some other region of attraction. Unless the region is perfectly homogeneous, this transition occurs over another range of $\sigma_g$. Hence, the range of $\sigma_g$ for which a given connected region of attraction is present in an $\vec{F}$, is both preceded and followed by a transition interval during which time no region of attraction exists.

Region boundaries are identified by comparing, for each $\sigma_g$, each vector in F with its eight nearest neighbors. For example, to determine whether or not a region boundary exists between $(x_o, y_o)$ and $(x_o, +1, y_o)$, the test described in FIG. 5(a), Step II is used. Analogous tests are used for the other neighboring vector pairs.

As $\sigma_g$ approaches zero, all regions of attraction are connected and correspond to the regions in the image which are perfectly homogeneous. Thus, the identified edges at this scale have closed contours. Because the number of such regions is typically very large, a larger initial value of $\sigma_g$ is used as the initial scale in order to decrease the computational cost of this method. This initial value must be small enough so that all perceptually significant region still have closed contours. This value could be determined adaptively. However, in the present implementation we fix $\sigma_g=3$ for grayscale images. Regions are identified at the initial scale by identifying contiguous points not labelled as boundary points, and then adding the boundary points to their corresponding regions. An edge segment represents the set of all boundary points which separate two given regions. The edge segments at this initial scale comprise the finest scale segmentation.

Figure 4A:
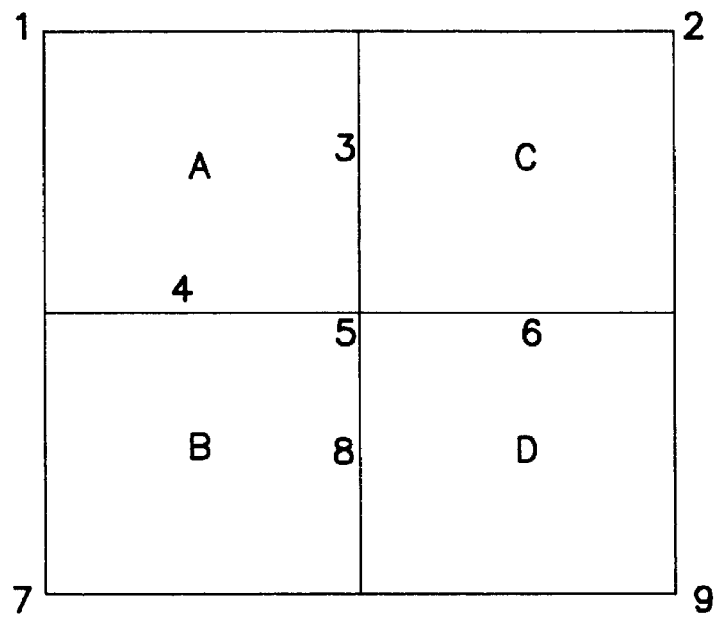
FIG. 4(a) is a schematic representation of an image shown on a fine scale.
Figure 4B:
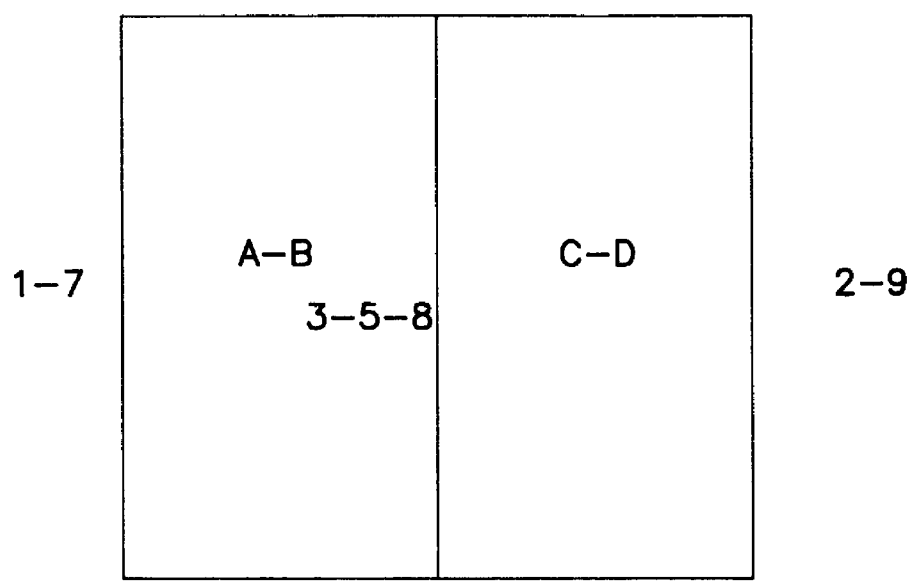
FIG. 4(b) is a schematic representation of the image of FIG. 4(a) shown on a coarse scale.

As $\sigma_g$ is increased beyond its initial value, the identified edges gradually disappear according to their strength beginning with the weakest. In general, edge strength varies along a given edge segment. As a result, an edge segment disappears over a continuous range of $\sigma_g$. The method of this invention considers an edge segment to be fully present until more than half of its edges have disappeared, and fully absent at all coarser scales. Other limitations for disappearance of an edge segments may, however, be employed. When an edge segment disappears, the two regions it separates are considered to have merged. This requires the list of edge segments to be updated accordingly. For example, in FIG. 4(a) there are four regions labelled alphabetically and with edge segments numbered as shown. FIG. 4(b) shows a coarser scale where regions A and B have merged together as well as regions C and D. This merging resulted in the new edge segments shown.

Regions fewer than three pixels in width are generally not identified. Also, if a large region is less than three pixels wide at some point, the region may be identified as two different regions. As a result, after regions are identified, not all boundary pixels are adjacent to a region. Thus, there exists a leftover boundary set of pixels which do not belong to any region. Pixels in the leftover set are appended to regions in a parallel process as described in Step III (2) in FIG. 5(b).

FIG. 5 illustrates a detailed process for the above implementation of the multiscale segmentation method. This flowchart depicts one embodiment of pseudo code instructions to perform the above sequence of operations. In Step I, the field vectors are determined. In Step II, the region boundaries are extracted from the image. In Step III, the finest scale regions are identified. Finally, in Step IV, the coarser scale regions are identified.

The present invention provides invariance to local edge geometry and this factor is a central factor in the design of the transform. The contrast scale parameter $\sigma_g$ provides a mechanism to accomplish contrast scaling. As $\sigma_g$ increases, adjacent regions may merge. This is because the attraction of a point in one region from another point across a region boundary may increase sufficiently so that the directional discontinuity in the force vector responsible for the edge may vanish. Thus changing $\sigma_g$ achieves the same result as contrast scaling. For any given $\sigma_g$, spatial scale parameter $\sigma_s$ helps achieve geometric scaling. As $\sigma_s$ increases, the force field at a point starts to get influenced by increasingly global structure having the given contrast parameter $\sigma_g$ resulting in sensitivity to larger structures. Further, a method of automatically determining the spatial scale and the contrast scale parameters is provided.

The present method provides for region detection even with changes in the force function used, variations in image edge geometry, variations in the exact types of homogeneity in image regions, and the extent of noise. As stated above, force $\vec{F}(p,q)$ is a nonincreasing function of the distance between P and Q and a nonincreasing function of the difference between the gray levels of P and Q. The qualitative properties of the transform which are responsible for the desired performance, hold for any such functions without depending on their exact types. Therefore, although the detailed distributions of the computed force values and the computational speeds depend on the specific functions used, the segmentation results are independent of them. As discussed above, a variety of functions may be used without effecting the resulting determinations significantly.

The present invention provides a method for determining the scale parameters at each image point before segmentation is performed. Any error, for example, in the spatial scale estimate at a point, may result in suboptimal performance since the force function used will deviate from possessing all the desirable properties. The sensitivity of the directional discontinuity in the force function to error in the spatial scale value used is as follows. For an edge through a point P which is smooth in the vicinity of P, the error in segmentation may be not as high as when the curvature assumes a high value or is undefined near P, e.g., when a corner is present along the edge close to P. This is because there may be a qualitative change in $\vec{F}_p$ as $\sigma_s$ increases and begins to include significant contributions from the parts of the edge beyond the corner or high curvature section of the edge. Therefore, the sensitivity of the transform near a corner which presents the worst for ergometric sensitivity may be examined.

Figure 6:
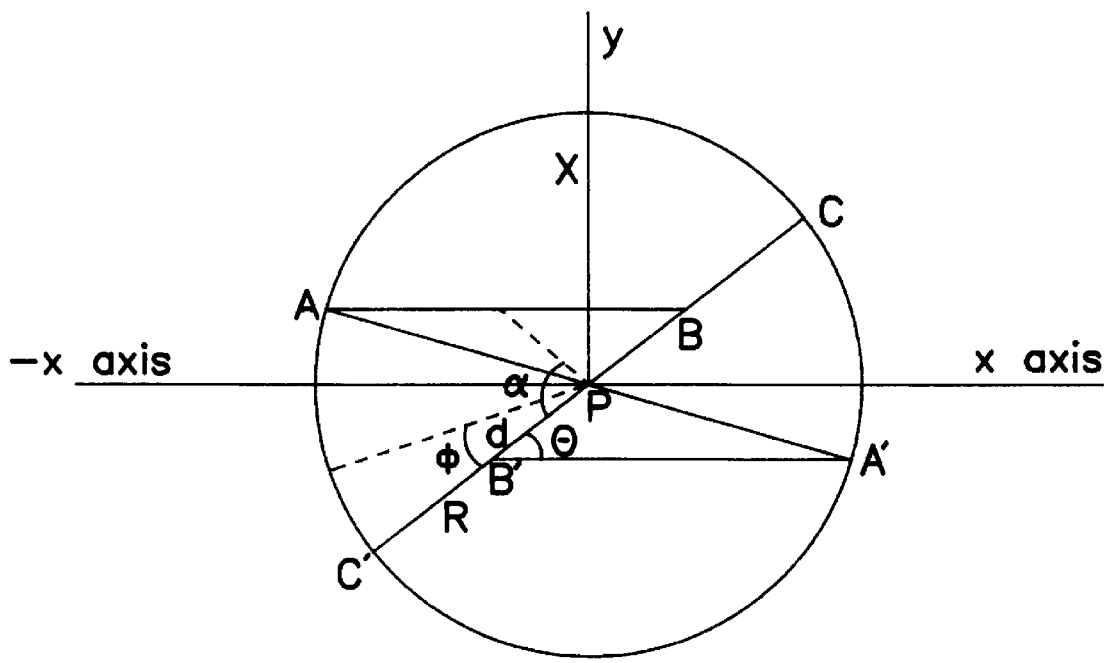
FIG. 6 depicts a schematic representation of an image containing a corner shaped region.

A corner of angle $\theta$ is depicted in FIG. 6. Point P is located a distance d away from the corner. A circle of radius R is provided and circumscribed around the triangle formed by points B'PA'. It is assumed that the value of $\sigma_g$ used allows detection of the corner contrast. $\vec{F}$ changes significantly as $\sigma_s$ increases, since for small $\sigma_s$ values the local structure appears as a long linear edge and for large $\sigma_s$ values the local structure appears as a wedge shaped region. The components $-\vec{F}_x$ and $\vec{F}_y$ of $\vec{F}$ can be computed in a known manner in terms of the known corner parameters. These components determine the magnitude and the direction of the force at P', a point just inside X (FIG. 6) and infinitesimally far from P.

The direction of $\vec{F}_p$ can also be computed in terms of the known corner parameters in a known manner. The force at a point just inside W and infinitesimally far from P is equal and opposite to that at P'. Thus, the force direction has a discontinuity of $\pi$ at P but the absolute direction of the force relative to the edge direction depends upon the parameters of the corner since the relative magnitudes of the components $\vec{F}_x$ and $\vec{F}_y$ depend on the corner parameters. Therefore, the method of the present invention detects edges even at corners which generally are the most difficult to detect.

Some of the properties of the affinity force vector determination listed above assumed that the regions have a homogeneous gray level. The segmentation performance of the transform holds for regions having others types of variations as well. If the region is not homogeneous in intensity, then the force at a point P in the region includes additional components due to differential rates of change of intensities in different directions away from P. For the simple case of an intensity ramp, the changes in intensity around P are still antisymmetric although not zero as for the homogeneous case. Since force depends on the absolute intensity difference, P still experiences equal and opposite forces from radially symmetric locations resulting in a zero force.

Regions in real images often have more complex spatial variation of intensity, e.g., a polynomial in image coordinates x and y. In such regions, the additional force due to differential gray level variation around P is nonzero, and the magnitude of the force vector includes these differential effects. However, so long as the gray level varies smoothly, no qualitative changes in F are detected as described with respect to the smoothness property. At a region boundary, directional discontinuities still exist because of the gray level discontinuity. In the process of finding the scale parameter values for the region, stable response of the force vector are found for the same scale values as if the region were homogeneous. Any directional discontinuities found which do not correspond to region edges do not persist if $\sigma_g$ is varied. Therefore, regions with shading but in contrast with the surround are still detected.

Noise often presents a problem for other edge and region detection systems. The present invention is not particularly sensitive to noise in the intensity values. For example, if the regions in an image are uniform but contain independently distributed, zero-mean, additive noise, then the expected deviation in force at any point P is zero compared to the case without noise. This is because changes in region intensities due to additive noise are spatially symmetric with respect to P, thus the deviation in attraction by one noisy pixel is cancelled on an average by another pixel on the opposite side of P. Therefore, the expected value of the force vector is the same with or without noise. This continues to hold for a ramp containing independent, zero-mean, additive noise for the same reason as for noisy homogeneous regions. For general shaded regions, the noise effects are anisotropic because the region intensities are symmetric. However, if the noise magnitude is small compared to the region contrast, then resulting changes in the force vector are incremental and only modulate those due to gray level asymmetry. The relatively large gray level discontinuity across region boundaries ensures that the changes in the force vector across the boundary are larger than the incremental changes on either side due to noise. Therefore, the directional discontinuities across region boundary persist and hence the region boundaries are still detected.

In addition to determining region boundaries, the present invention also determines information about the shape of the structure. This occurs because the force vector plot generated makes explicit the skeletons or central axes of the regions. The direction of the force points away from the boundary. This implies that for the appropriate values of the scale parameters at each point, as one moves away from region boundary towards the interior, there is a curve across which the force changes direction, from facing one side of the region boundary to facing the other. This curve represents an estimate of the region skeleton which is robust against noise in intensity values as well as shape perturbations. Region skeleton may also be identified by modifying the equation regarding the general definition of the force vector. In other words, if the term $\hat{f}_{pq}$ is dropped to compute only a scalar quantity, then the resulting distribution of the scalar values has a local maximum at the region skeleton. Thus, the present invention provides a method for determining shape by examining the plot of the force vectors.

Figure 7A:
FIG. 7(a) depicts a gray level image.
Figure 7B:
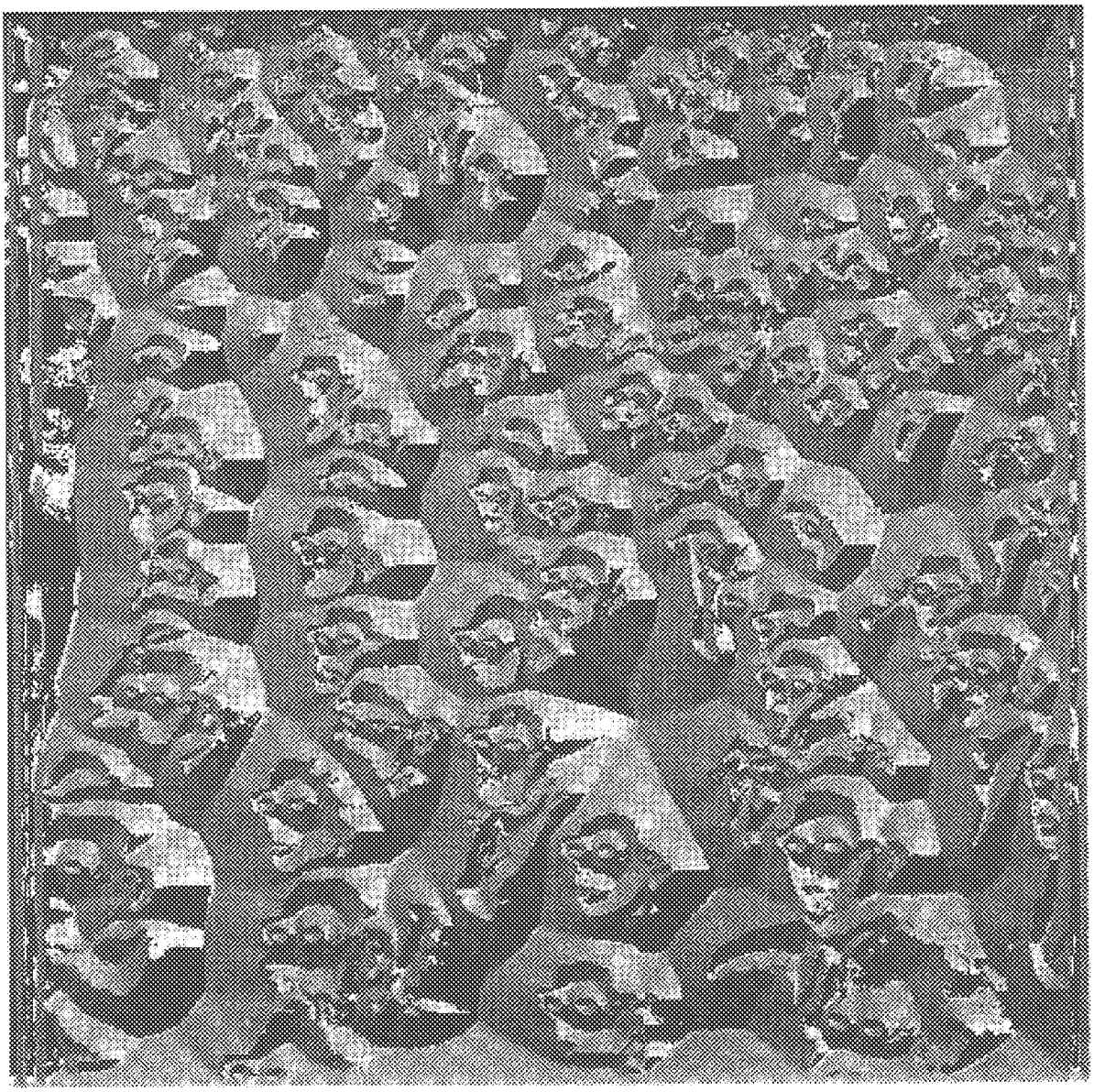
FIG. 7(b) depicts a force direction plot generated according to the present invention.

This present invention works on a number of images. FIGS. 7(a) and 7(b) depict an example of the results of the present invention. FIG. 7(a) depicts a 512×512 gray level image, such as a photograph. FIG. 7(b) depicts a force direction plot computed from the present invention using Gaussians in the definition of the force function and constants for $\sigma_s$ and $\sigma_g$ as described above. The brightness of the pixels in FIG. 7(b) is proportional to the direction angle. Different directions of the force vectors are shown coded by different gray levels. Edges and region skeletons are seen as directional discontinuities. This coding leads to artifact edges when the directions corresponding to the dark and bright gray levels occur at adjacent image locations. The corresponding discontinuities are ignored being artifacts of display.

Figure 8A:
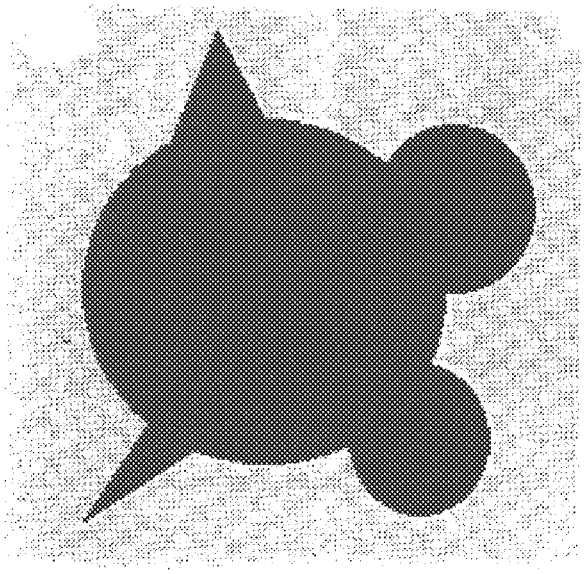
FIG. 8(a) depicts a binary synthetic image.
Figure 8B:
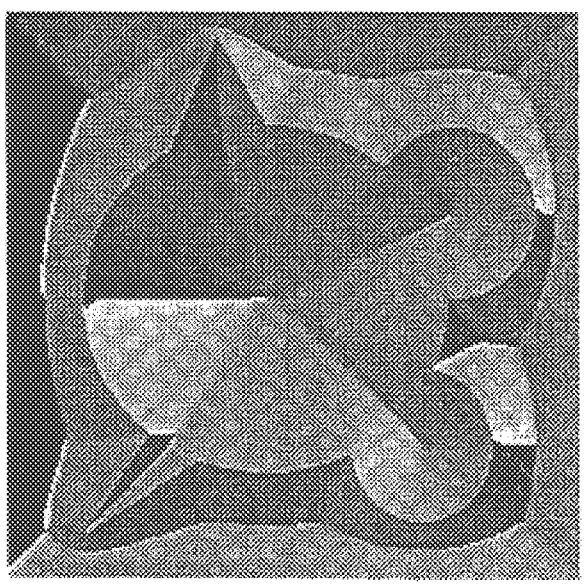
FIG. 8(b) depicts a force direction plot generated according to the present invention.

Another example is depicted in FIGS. 8(a) and 8(b). FIG. 8(a) depicts a binary synthetic image designed to test the performance of the present invention near edges of different curvatures and their junctions. As may be seen, the region is substantially homogeneous in brightness. FIG. 8(b) depicts the results of the present invention on the image of FIG. 8(a). The edges and skeletons are visible as directional discontinuities. FIGS. 8(a) and 8(b) demonstrate the lack of sensitivity of the present invention to edge geometry, again using Gaussians in the definition of F, and fixed values of $\sigma_s=7$ and $\sigma_s=20$ at all pixels. The synthetic image was designed to contain linear and curved segments as well as corners formed by them. The computed directional discontinuities of the force vectors coincide with edges for all parts of boundary without any smoothing as desired, which is not possible using traditional methods. The skeletons of the regions may also be seen from the directional discontinuities present along them.

Figure 9A:
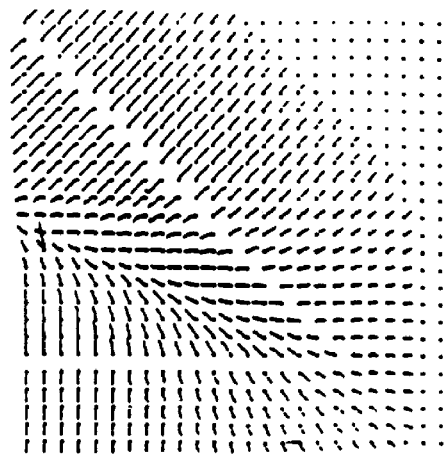
FIGS. 9(a)–9(f) depict force direction plots generated according to the present invention for an image having a corner as in FIG. 6.
Figure 9D:
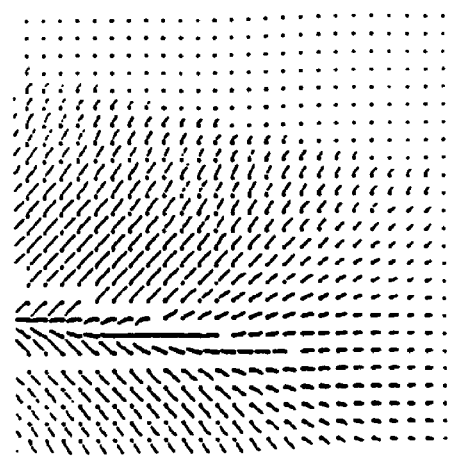
Figure 9B:
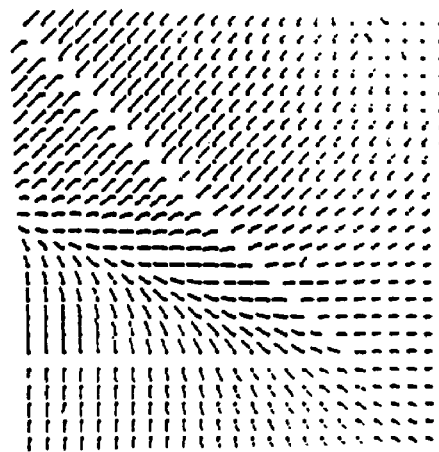
Figure 9E:
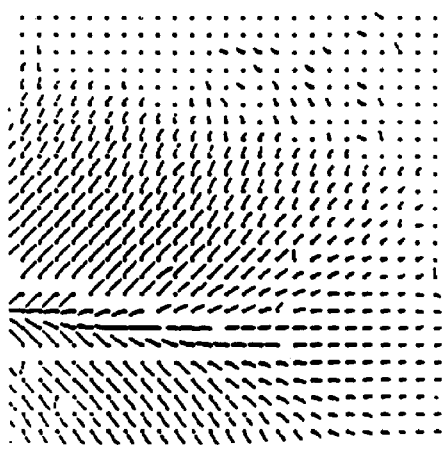
Figure 9C:
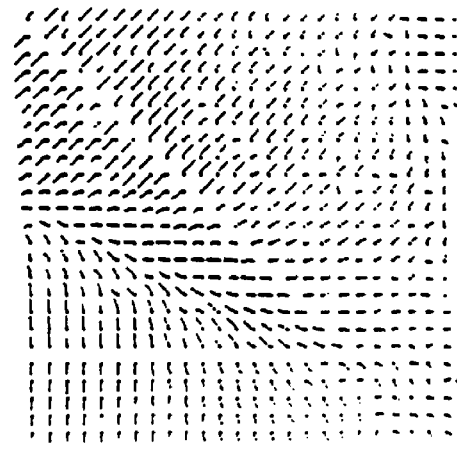
Figure 9F:
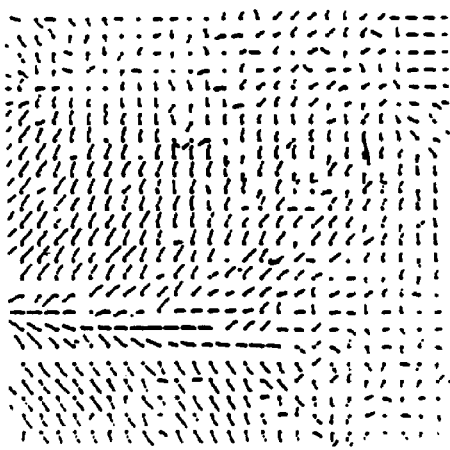

FIGS. 9(a)–9(f) depict various resulting force vector plots for a corner shaped region a corner shaped region having a contrast of 100. FIGS. 9(a)–9(c) depict force vector plots for a 45 degree corner as depicted in FIG. 6. FIGS. 9(d)–9(f) depict force vector plots for a 15 degree corner. In these plots, the force vectors are depicted as line segments with the length being proportional to the magnitude of the force and the dot representing the tail of the vector. Corners normally present difficulties for traditional detection systems. The present invention detects the edges without difficulty as seen in the results. FIGS. 9(a) and 9(d) depict the results with no additive noise in the image. FIGS. 9(b) and 9(e) depict the results from an image having zero-mean, Gaussian additive noise having a standard deviation of 10. FIGS. 9(c) and 9(f) depict results from an image having zero-mean, Gaussian additive noise having a standard deviation of 30. The results in FIGS. 9(a)–9(f) show that the directional discontinuities coincide with even the edges of the 15 degree corner without any rounding at the corner.

Figure 10:
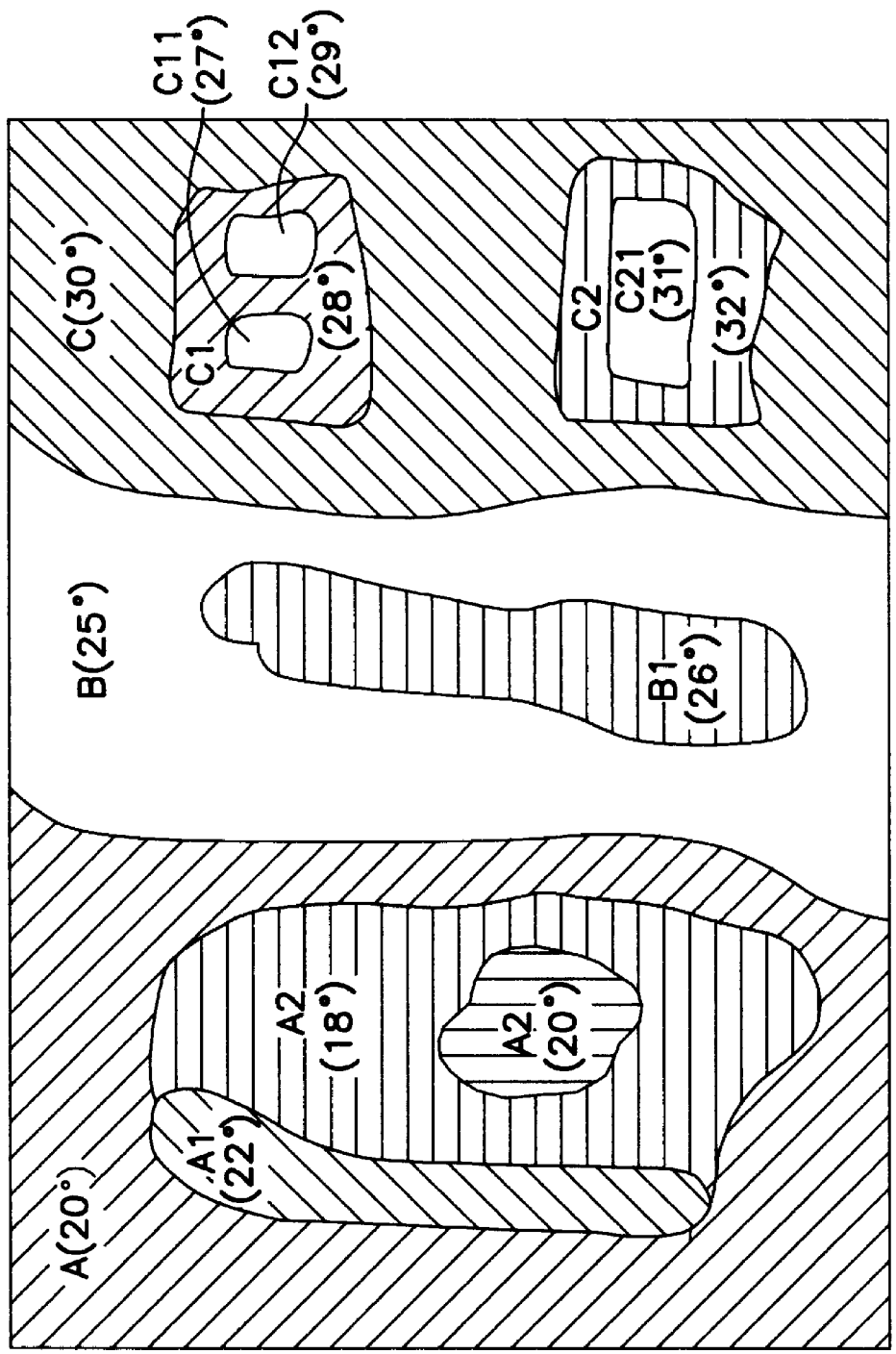
FIG. 10 depicts a schematic representation of a weather map image.

FIG. 10 depicts a two dimensional image of data collected for a weather map. The data in the image represents temperature at a certain height in the atmosphere. The goal is to determine all regions whose temperature is substantially uniform, i.e., to delineate all regions such that the temperature variation within a region is much smaller than the contrast across its boundary. The image of FIG. 10 depicts a typical weather structure whereby fronts delineate changes in temperature and pockets of temperature form within the various fronts.

The image contains three large regions A, B, and C. The average temperature throughout these regions is 20°, 25°, and 30°, respectively. Each region has a variation of 2° within its region. Therefore, the temperatures in region A are from 18°–22°, the temperatures in region B are from 23°–27° and the temperatures in region C are from 28° to 32°. The contrast between A and B is 5° and the contrast between B and C is also 5°. Each of the larger regions, A, B and C contain regions of finer scale. Subregion A1 has an average temperature of 22° with a variation of 1°, thus containing temperatures in the range from 21°–23°. A2 has an average temperature of 18° with a range of 17°–19°. A21 is a subregion of subregion A2 with a temperature of 20° at every point inside the region. B1 has an average temperature of 26° and a range of 25°–27°. C1 has an average temperature of 28° and a range of 27° to 29°. C2 has an average temperature of 32° with a range of 31°–33°. C11, C12, and C21 are each subregions of a subregion and have uniform temperatures of 27°, 29°, and 31° respectively.

As explained above, for multiscale determination, the first step is to determine the spatial scale parameter and contrast scale parameter pairs to use for each point. As discussed above, this step involves producing force vectors for all possible pairs of spatial scale and contrast scale parameters. After this is performed, the proper pair of parameters is selected automatically according to the method of the present invention. Alternatively, these pairs could be determined manually by examining each of the vectors generated for each pair of parameters to determine the optimal pairs for each point.

Once the parameter pairs associated with each point have been determined, these pairs may be used to generate force vectors for each point in the image. Thus, multiple scales are used to generate the force field plot. As such, if the proper parameter pairs have been used for each point, the region boundaries are characterized by spatial discontinuities of magnitude π radians in the direction of $\vec{F}$.

For the example of FIG. 10, if for example, the image has 512×512 points, then the $\sigma_s, \sigma_g$ pair of (10, 0) may be determined to be the proper pair for the points near the centers of A21 and C21 which may be the same size, for example 10, but not the near the centers of regions A, B, and C, for example, which may be about three times larger as depicted in FIG. 10. Thus, when the force vectors for those points along the boundaries of A21 and C21 are generated using the appropriate values of $\sigma_s, \sigma_g$ corresponding to the values (10,0) near the centers, spatial discontinuities of magnitude $\pi$ pointing toward the center of regions A21 and C21 respectively are determined. More coarse pairs, such as a pair of (30, 2), may be determined to be the appropriate pairs for the points near the centers of A, B, and C. Thus, when appropriate values of $\sigma_s, \sigma_g$ corresponding to (30,2) near the centers are used to determine the force vectors for points on the region boundaries of A, B, and C, discontinuities of $\pi$ radians pointing toward the center of regions A, B, and C are determined.

In this manner, any level of complexity within an image may be determined to fit the particular application by selecting the scales which are to be used in the evaluation. For example, if one only wanted to know the weather for a particular region of the country, then a region map containing only A, B and C may be acceptable. Therefore, every point in the image may be analyzed using single scale analysis using, for example, the appropriate pairs determined for the boundaries between regions A, B, and C. However, if one wanted to know the temperature exactly at some location such as a location in region A21, for example, then, analysis at a single geometric and photometric scale may be provided using the pairs appropriate for that region. Also, to have the appropriate level of complexity, analysis at multiple geometric and photometric scales may be performed as described above.

The temperature data of FIG. 10 may be replaced by other scalar data such as pressure or gas percentage in the air, for example. The temperature could also be replaced by wind direction data. Wind direction data is two dimensional, having two angles, and is thus represented by vectors. The determination of the force vectors involves using sensitivities (differences) between pairs of numbers instead of just single numbers. Thus, the $\sigma_g$ parameter would involve a pair of sensitivities (differences), for example 1, southwest and 10 degrees from the ground.

Further, the temperature image could be replaced by three dimensional data. The points are thus in three dimensional space with neighboring points in three directions instead of two. The determination allows for this by computing the force vectors to be a three dimensional vector instead of just a two dimensional vector. Thus three dimensional temperature structures in three dimensions may be provided. The resulting regions detected are then volumes, not areas as in the two dimensional case. This may be used, for example, to determine three dimensional volumes of uniform wind direction. The data may also be replaced by higher dimensional data in which each entry is a vector size larger than 2. Determination then must change trivially, but the results are still obtainable using the present invention. Further, this invention is not to be limited to weather maps. Many other applications exist for the present invention as discussed in the summary of the invention. The images analyzed may be, for example, MRI recognition of a body part, ECG data, speech recognition, texture analysis, etc.

Figure 11:
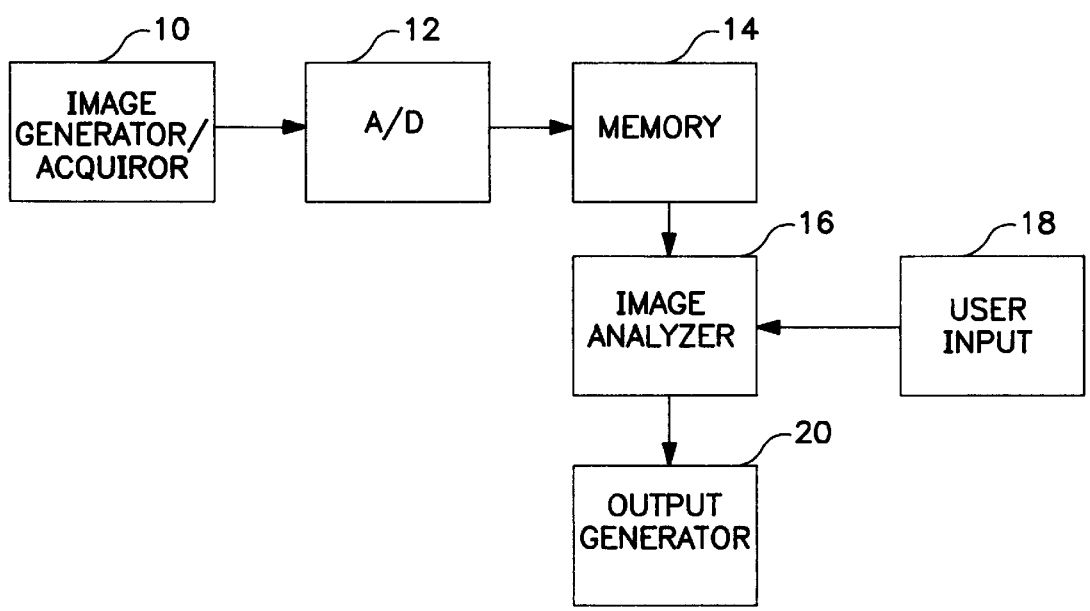
FIG. 11 depicts a schematic diagram of a system according to the present invention.

The present invention also provides a system for determining region boundaries. FIG. 11 depicts a system according to the present invention. An image generator/acquirer 10 is provided which produces an image in a known manner. Image generator/acquirer 10 may produce or acquire an analog image. In such a situation, an analog to digital converter 12 may be provided. The image is then stored in a memory 14. Image analyzer 16 receives inputs from a user via user input 18 and uses this information along with the image in memory 14 to produce the force vector field plots according to the method described above. These plots may be output by output generator 20.

Image generator/acquirer 10 may be, for example, a camera, a weather map generating device, an x-ray machine, or an MRI machine. Any device which provides or acquires an image may be used as image generator/acquirer 10. Analog to digital converter 12 may be any type of A/D device for converting analog images into digital images.

Memory 14 may be any type of memory capable of storing an image, such as a RAM, an EEPROM, etc. User input 18 may be any time of user input device such as a keyboard, joystick, mouse, voice receiver, motion detector, etc. Image analyzer 16 may be any type of device capable of performing the determinations defined in the method above. For example, a computer such as that having a 486 microprocessor may be used. Also, a supercomputer or other high throughput uniprocessor or multiprocessor system or special purpose hardware may be used. Output generator 20 may be any device capable of outputting a plot of vectors at a plurality of points, such as a printer, a video screen, a plotter, or a link to another computer, for example.

Image analyzer 16 may also perform the determination of region boundaries within an image. For example, image analyzer 16 may be provided with artificial intelligence which provides for detection of these boundaries. Also, image analyzer 16 may be provided with software programmed to perform the determination of when regions are present. Also, the step of determining the region boundaries may be performed by a human upon viewing a plot.

Image analyzer 16 may also perform detection of region axes within an image using artificial intelligence and/or software. Also, the steps of determining region skeletons may be performed by a human upon viewing the plot.

Structure detection is a universal problem in automatic interpretation of spatial structure in data. Following is a partial list of application areas and problems which the present invention may solve; image coding; image compression, image storage, image transmission, image tracking, e.g., for HDTV or videophone, image synthesis: selection of parts of real images without distortion; image display: postscript printing, image manipulation e.g., on personal computers and workstations; speech processing: speaker identification, speech recognition; medical imaging: EKG monitoring, sleep recognition, monitoring of other bodily functions; visualization: selection and display of volumetric medical data such as that generated with tomography; and texture analysis: recognition and discrimination of textured surfaces e.g. crops, water, urban areas. These are simply examples of the types of data and areas in which the present invention may be used.

Although a preferred embodiment of the present invention has been described in detail above, the invention is not limited thereto. It will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby but is to be determined by the claims which follow.

What is claimed is:

1. A method of determining region boundaries in an image comprising the steps of:

providing an image having a plurality of discrete points;

determining for each discrete point in said image an affinity force vector representing that discrete point's affinity to every other discrete point in the image, said step of determining an affinity force vector for each discrete point comprising the steps of:

determining a point-to-point affinity force vector for that discrete point with respect to every other discrete point, each point-to-point affinity force vector comprising a magnitude and a direction, the magnitude representing that discrete point's affinity for one other discrete point determined by using a function representing a difference between a multivalued level of the two discrete points and the direction representing the direction of that discrete point's affinity for the one other discrete point; and vectorially summing all of the point-to-point affinity force vectors for that discrete point; and detecting region boundaries in the image using said affinity force vectors.

2. The method of claim 1 wherein said step of detecting comprises:

plotting said affinity force vectors; and detecting a region boundary where adjacent points are represented by affinity force vectors whose directions are opposite one another.

3. The method of claim 1 wherein said image comprises a plurality of spatial scales and contrast scales which are represented by a spatial scale parameter and a contrast scale parameter, respectively, and wherein said method further comprises the steps of:

i) generating a force vector for each of a plurality of spatial scale parameter-contrast scale parameter pairs at each discrete point in the image;

ii) selecting at least one of said pairs for each discrete point in the image;

iii) determining for each discrete point in the image an affinity force vector representing a sum of the affinity of that discrete point to every other discrete point in the image using the spatial scale parameter-contrast scale parameter pair selected for that discrete point.

4. The method of claim 1 wherein each point in said image represents an n dimensional data, wherein n is a discrete number.

5. The method of claim 1 wherein each point in said image represents a location in an m dimensional space, wherein m is a discrete number.

6. The method of claim 1 further comprising the steps of: detecting axes for each region in said image.

7. The method of claim 1, wherein said step of determining uses a spatial scale parameter and a contrast scale parameter selected for each discrete point in the image to determine each affinity force vector for each discrete point in the image.

8. The method of claim 1, wherein said step of detecting is performed automatically by recognizing the points of discontinuity in the affinity force vector determination.

9. An apparatus for determining region boundaries in an image comprising:

an image generator for providing an image having a plurality of discrete points;

means for determining for each discrete point in said image an affinity force vector using a spatial scale parameter and a contrast scale parameter, said affinity force vector representing a sum of point-to-point affinity force vectors from the point to every other point in the image, each point-to-point affinity force vector representing a force and direction of affinity of said point to one other point in the image the force being determined by using a function representing a difference between a multivalued level of the two discrete points; and means for detecting region boundaries in said image using said affinity force vectors.

10. The apparatus of claim 9 further comprising:

means for plotting said affinity force vectors; and means for detecting a region boundary where adjacent points are represented by affinity force vectors whose directions are opposite one another.

11. The apparatus of claim 9 wherein said image comprises a plurality of spatial scales and contrast scales which are represented by a spatial scale parameter and a contrast scale parameter, respectively and further comprising:

i) means for generating a force vector for each of a plurality of spatial scale parameter-contrast scale parameter pairs at each discrete point in the image;

ii) means for selecting at least one of said pairs for each discrete point in said image;

iii) means for determining for each discrete point in said image an affinity force vector representing a sum of the affinity of that discrete point to every other discrete point in the image using the spatial scale parameter-contrast scale parameter pair selected for that point.

12. The apparatus of claim 9 wherein each point in said image represents n dimensional data, wherein n is a discrete number.

13. The apparatus of claim 9 wherein each point in said image represents a location in an m dimensional space, wherein m is a discrete number.

14. The apparatus of claim 9 further comprising:

means for detecting axes for each region in said image.

15. The apparatus of claim 9, wherein said means for determining specifies for input a spatial scale parameter and a contrast scale parameter to determine each affinity force vector.

16. The apparatus of claim 9, wherein said means for detecting automatically determines said boundaries by recognizing the points of discontinuity in the affinity force vectors.

* * * * *